K. W. HEYMAN.
STRAINER FOR MILK OR OTHER LIQUIDS.
APPLICATION FILED DEC. 9, 1911.
1,035,790.
Patented Aug. 13, 1912.
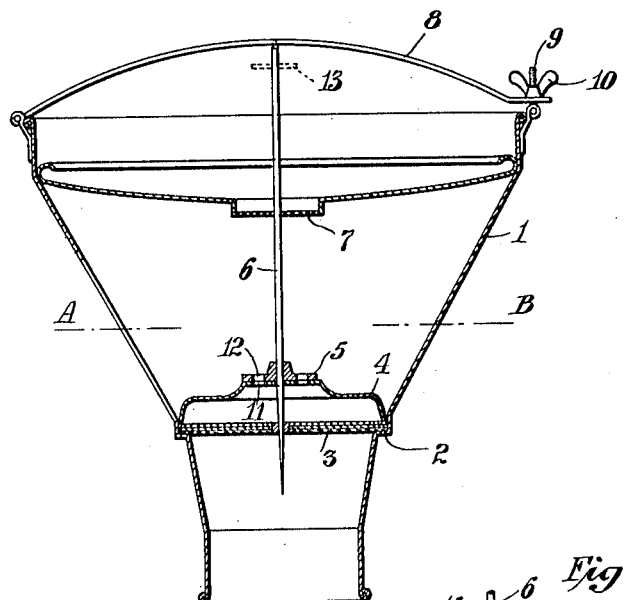
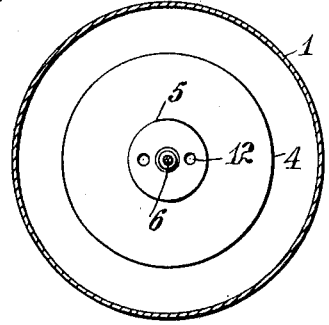
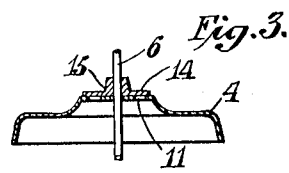
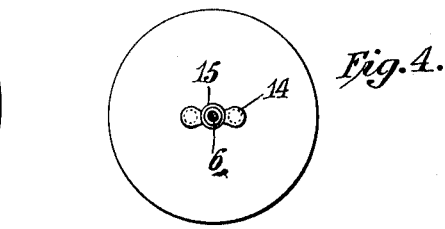
Attest:
Inventor:
Knut Waldemar Heyman
by
his Atty

UNITED STATES PATENT OFFICE.

KNUT WALDEMAR HEYMAN, OF SKOGSTORP, TUMBA, SWEDEN.

STRAINER FOR MILK OR OTHER LIQUIDS.

1,035,790.  Specification of Letters Patent.  Patented Aug. 13, 1912.

Application filed December 9, 1911. Serial No. 664,787.

*To all whom it may concern:*

Be it known that I, KNUT WALDEMAR HEYMAN, a subject of the King of Sweden, and resident of Skogstorp, Tumba, in the Kingdom of Sweden, estate owner, have invented certain new and useful Improvements in Strainers for Milk or other Liquids, of which the following is a specification, reference being made to the accompanying drawing.

My invention relates to an improved liquid strainer, and is particularly adapted for use as a milk strainer.

The principal object of the invention is to provide a thoroughly sanitary strainer, which is simply constructed and may be easily assembled and disassembled, danger of infection being obviated by eliminating all necessity for manual contact, during the straining operation, with any of the parts over or through which the liquid passes.

In the accompanying drawing is shown, by way of example, a milk strainer carried out according to this invention, Figure 1 is a vertical section of the strainer, while Fig. 2 is a horizontal section of the same on line A—B of Fig. 1. Figs. 3 and 4 are a vertical section and a top plan view, respectively, of a modified detail.

The funnel 1 forms a shoulder 2 against which the filtering element 3, consisting of a layer of a suitable filtering material, for instance cotton wool wad, placed between two straining plates, is kept pressed by means of a member 4 in the shape of a bell or cap, said member being situated above the filtering element. The member 4 is acted upon by a round disk 5 on a spindle 6 which is placed centrally within the funnel 1 and tapers downward so as to form a point. This spindle passes down through central holes in the cap 4 and the filtering element 3. The hole in the latter must accurately correspond, in shape as well as in size, to the part of the spindle within the same, so that no milk can pass down through this hole. The part of the spindle surrounded by the filtering element should to this end be conical; it is therefore preferred that the tapering of the spindle commences above the filtering element. In the upper part of the funnel may be placed a coarse strainer 7 having a central hole for the spindle 6. As will be seen, the uppermost part of the spindle 6, which part serves as a handle in performing an operation hereinafter described, is located above the upper edge of the funnel 1, so that the milk in the funnel cannot come into contact with the said part of the spindle.

The disk 5, which is firmly attached to the spindle, is pressed by means of a bow 8, located above the upper edge of the funnel 1 and acting on the upper end of the spindle, against the upper side of the cap 4, which thus keeps the filtering element 3 pressed against its abutment or shoulder 2. The bow 8 is hinged at its one end to the funnel while the other end thereof is detachably connected to the funnel in any suitable manner, for instance by a threaded swingable bolt 9 and a thumb nut 10, as shown. When the thumb nut has been loosened and the bolt 9 and the bow 8 have been swung on their pivots, the parts within the funnel may easily be removed. As clearly appears, the milk in the funnel cannot come into contact with the bow 8, which must be touched by the hands, when the filtering element 3 and the cap 4 are inserted into the funnel. The part of the cap 4 which is just beneath the disk 5 is provided with apertures 11, corresponding apertures 12 being provided in the disk 5. By turning the spindle 6, to which end a pin 13 passed through the spindle is actuated, the supply of milk to the filtering element 3 may—as will easily be seen—be regulated so as to be kept at a practically constant size, corresponding to the straining effect needed in different cases.

In the modification shown in Figs. 3 and 4, wings 14 extending from a hub 15 mounted on the spindle 6, have been substituted for the disk 5 provided with the apertures 12, as shown in Figs. 1 and 2. This device, obviously, acts in the same way as the corresponding device in Figs. 1 and 2 both as regards the securing of the filtering element and the regulation of the supply of milk to said element.

When the milk strainer is to be used, the filtering element 3 and the cap 4 are inserted into the same thereby that the pointed end of the spindle 6 is passed through the central holes in the said parts, so that the latter are carried by the spindle, which is held by the hand at its other end. Thereupon the parts 3 and 4 are inserted into the funnel 1 by means of the spindle 6, which is still held by the hand at the said (upper) end only, while the funnel is held in an inclined position, whereupon the bow 8 is clamped in position above the spindle. By this means the disk 5 is pressed against the cap 4, so that the filtering element 3 is pressed against the shoulder 2, while the tapering part of the spindle is caused to bear on the wall of the central hole in the filtering element. It is obvious that before the said operation is performed the parts 1 to 7, inclusive, must be thoroughly cleansed and as much as possible free from bacteria. It is easily seen that during this operation none of the surfaces which are in contact with the milk during the straining, will be touched by the hands of the person performing the said operation so that a transfer of infectious matters to the milk by such contact is prevented as much as possible. Moreover, inasmuch as each surface element, even the smallest one, is easily accessible for cleansing so that all remainders of milk which become sour can be effectually removed and the supply of milk to the filtering element can be regulated as required, it will be seen that a milk strainer constructed according to this invention will be well adapted to accomplish its purpose.

Having now described my invention, what I claim as new and desire to secure by Letters Patent is:

1. In a liquid strainer, the combination with the casing, of a filtering medium supported transversely therein, apertured means exerting pressure on said filtering medium to retain the same in position, and means whereby the size of the apertures in said first named means may be varied to regulate the quantity of liquid passing to said filtering medium.

2. In a liquid strainer, the combination with the casing having a support formed therein, of a filtering medium resting on said support, apertured means for exerting peripheral pressure on said medium and retaining the same on the support, and means for varying the size of the apertures in the first named means to regulate the quantity of liquid passing therethrough to the filtering medium.

3. In a liquid strainer, the combination with the casing, of a filtering medium supported therein, an apertured cover resting on said filtering medium to retain the same in position, and means for varying the size of the apertures in said cover to regulate the quantity of liquid passing therethrough to the filtering medium.

4. In a liquid strainer, the combination with the casing, of a filtering medium supported therein, an apertured cover resting on said filtering medium, a spindle passing through said cover and filtering medium, and means carried by the spindle for varying the size of the apertures in said cover to regulate the quantity of liquid passing therethrough to the filtering medium.

5. In a liquid strainer, the combination with the casing, of a filtering medium supported therein, an inverted substantially cup-shaped cover resting on said filtering medium, said cover being provided with apertures in its base, a spindle passing through said cover and filtering medium, and means carried by said spindle for varying the size of the apertures in said cover to regulate the quantity of liquid passing therethrough to the filtering medium.

6. In a liquid strainer, the combination with the casing, of a filtering medium supported therein, an apertured cover resting on said filtering medium, a spindle passing through said cover and said filtering medium, means carried by said spindle for varying the size of the apertures in said cover, and means for exerting pressure on one end of said spindle to force said first named means against the cover and retain the filtering medium in position.

7. In a liquid strainer, the combination with the casing having a supporting shoulder formed therein, of a filtering medium resting transversely in the casing on said shoulder, an inverted substantially cup-shaped cover resting peripherally on said filtering medium, said cover having apertures in its base, a conical spindle passing through said cover and filtering medium, a plate carried by said spindle and adapted to rest in contact with the apertured base of the cover, means for revolving the spindle to vary the size of the apertures in the cover, and means adapted to exert pressure on one end of said spindle to force said plate against said cover and retain the filtering medium in position.

In witness whereof I have hereunto set my hand in presence of two witnesses.

KNUT WALDEMAR HEYMAN.

Witnesses:
H. B. OHLSSON,
CARL TH. SUNDHOLM.

Copies of this patent may be obtained for five cents each, by addressing the "Commissioner of Patents, Washington, D. C."